United States Patent
Park et al.

(10) Patent No.: US 7,715,632 B2
(45) Date of Patent: May 11, 2010

(54) APPARATUS AND METHOD FOR RECOGNIZING AN IMAGE

(75) Inventors: Sang-Cheol Park, Seoul (KR);
Byoung-Chul Ko, Seoul (KR);
Kwang-Soo Kim, Seoul (KR);
Kyong-Ha Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1030 days.

(21) Appl. No.: 11/249,092

(22) Filed: Oct. 12, 2005

(65) Prior Publication Data

US 2006/0126939 A1    Jun. 15, 2006

(30) Foreign Application Priority Data

Dec. 9, 2004    (KR) ............... 10-2004-0103452

(51) Int. Cl.
G06K 9/46    (2006.01)
G06K 9/66    (2006.01)
G06K 9/62    (2006.01)
(52) U.S. Cl. ..................... 382/190; 382/159
(58) Field of Classification Search ............ 382/159, 382/168, 190, 209
See application file for complete search history.

(56) References Cited

U.S. PATENT DOCUMENTS

| 6,185,337 B1* | 2/2001 | Tsujino et al. ............. 382/227 |
| 6,611,613 B1* | 8/2003 | Kang et al. ................ 382/118 |
| 6,671,391 B1* | 12/2003 | Zhang et al. ............... 382/118 |
| 6,895,103 B2* | 5/2005 | Chen et al. ................. 382/117 |
| 7,050,607 B2* | 5/2006 | Li et al. ..................... 382/118 |

FOREIGN PATENT DOCUMENTS

JP    2004-078959    3/2004

* cited by examiner

*Primary Examiner*—Aaron W Carter
*Assistant Examiner*—Stephen R Koziol
(74) *Attorney, Agent, or Firm*—The Farrell Law Firm, LLP

(57) ABSTRACT

Disclosed are an apparatus and a method for recognizing a specific subject from a still image or a moving image at a high speed. An object of the apparatus and the method is to reduce the amount of information required for image recognition. One feature vector value is extracted by using one feature template for dividing an image into a plurality of areas, and learning and image recognition is performed with respect to a subject to be recognized in the image using the extracted feature vector value.

12 Claims, 4 Drawing Sheets

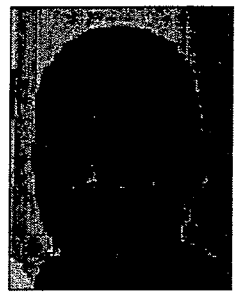
FIG.2A    FIG.2B
FIG.3A    FIG.3B    FIG.3C    FIG.3D

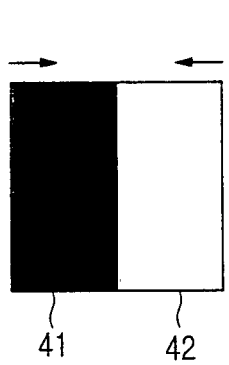 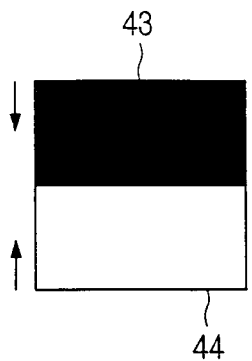 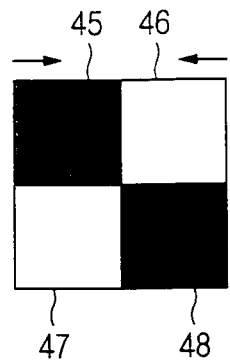 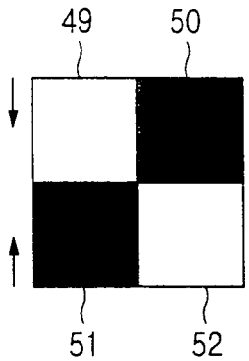
FIG.4A   FIG.4B   FIG.4C   FIG.4D
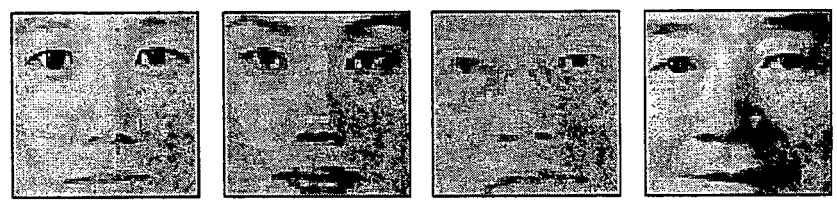
FIG.5A
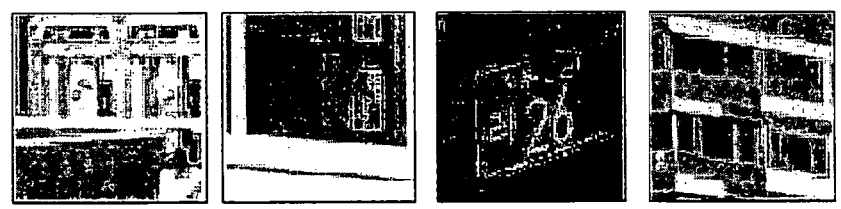
FIG.5B

APPARATUS AND METHOD FOR RECOGNIZING AN IMAGE

PRIORITY

This application claims priority to an application entitled "Apparatus and Method for Recognizing Image" filed in the Korean Intellectual Property Office on Dec. 9, 2004 and assigned Serial No. 2004-103452, the contents of which are incorporated herein by reference.

BACKGROUND OF THE INVENTION

1. Field of the Invention

The present invention relates to an apparatus and a method for recognizing an image, and more particularly to an apparatus and a method for recognizing a specific subject from a still image or a moving image at a high speed.

2. Description of the Related Art

In order to recognize a specific subject from an image, a device for recognizing an image must receive learning data for the image and information about candidate areas used for distinguishing the specific object from other objects in the image. At this time, the use of both subject information and pixel information about the candidate area requires a great amount of time and computing power.

For this reason, the conventional technique uses either feature information or edge information about a concerned area used for determining a certain subject instead of inputting all pieces of information about the concerned area, thereby reducing the amount of information required for image recognition. Thus, various schemes for reducing the amount of information may exist according to schemes of extracting feature information. However, the schemes for reducing the amount of information determine a subject using either feature information or an intrinsic vector and an intrinsic value extracted from an edge image. In the conventional technique, even when the minimum size of a candidate area used for determining a subject is, for example, 64×64 pixels, the number of the pixels is 4096. The 4096 pixels become 20480 dimensions when they are multiplied by the dimensions of x and y coordinates and RGB. If a candidate area having an amount of information larger than an amount of information of 64×64 pixels is employed, the dimension of input information may be within the range of several hundreds of thousands to several millions.

This great amount of information degrades the performance of a device for recognizing an image and requires a great amount of initial learning time. In addition, an image having this great amount of information is not suitable for both a portable terminal having little computing power and a server environment over a network.

A variety of typical schemes for finding an edge image used for reducing the amount of information required for recognizing an image only extract more detailed edge information, but actually do not reduce an amount of input information.

SUMMARY OF THE INVENTION

Accordingly, the present invention has been made to solve the above-mentioned problems occurring in the prior art, and an object of the present invention is to reduce the amount of information required for recognizing an image.

Another object of the present invention is to reduce the amount of learning data of a subject to be recognized in an image recognizing apparatus.

Still another object of the present invention is to provide an apparatus and a method for recognizing an image, which can reduce the amount of learning data of an image subject to be recognized.

Still another object of the present invention is to provide an apparatus and a method for recognizing an image, which can reduce the amount of information required for image recognition.

Still yet another object of the present invention is to reduce the amount of information required for image recognition by using a feature template dividing a candidate area for image recognition into a plurality of areas.

Still yet another object of the present invention is to provide an apparatus and a method for recognizing an image, which can perform learning and image recognition for an image subject using a feature template dividing a candidate area for image recognition into a plurality of areas.

To accomplish the above objects, the apparatus for recognizing an image extracts one feature vector value by using one feature template dividing an image into a plurality of areas and performs learning and image recognition with respect to a subject to be recognized in the image using the extracted feature vector value.

The feature vector value is obtained by calculating differences between pixel values in plural areas for a corresponding feature template and summing up the differences, and the feature template is provided according to subjects to be recognized.

The learning is performed by employing an identical feature template for a subject to be recognized and an image which is not the subject to be recognized and extracting a criterion for distinguishing a subject to be recognized and an image which is not the subject. The recognition is performed by comparing the criterion extracted through the learning with a feature vector value of the subject to be recognized.

The apparatus for recognizing an image includes an image preprocessing module for adjusting the brightness of the image so as to clear the contour of a subject to be recognized, an edge extracting module for extracting horizontal edge information and vertical edge information from an image having its contour clearly adjusted by the image preprocessing module, a feature template processing module for extracting a feature vector value from the vertical edge information and the horizontal edge information using an identical feature template, and an image recognizing module for extracting a criterion for determining an image using the feature vector value and recognizing the subject using the criterion.

According to another aspect of the present invention, there is provided a method for recognizing an image, including extracting one feature vector value by using a feature template dividing an image into a plurality of areas, and performing learning and image recognition with respect to a subject to be recognized in the image using the extracted feature vector value.

The method for recognizing an image further includes adjusting the brightness of the image so as to clear the contour of a subject to be recognized, extracting horizontal edge information and vertical edge information from an image having its contour clearly adjusted by the image preprocessing module, extracting a feature vector value from the vertical edge information and the horizontal edge information using an identical feature template, extracting a criterion of determining an image using the feature vector value, and recognizing the subject to be recognized using the criterion.

BRIEF DESCRIPTION OF THE DRAWINGS

The above and other objects, features and advantages of the present invention will be more apparent from the following detailed description taken in conjunction with the accompanying drawings, in which:

FIGS. 2A and 2B illustrate an example of an image preprocessing procedure according to the present invention;

FIGS. 3A to 3D illustrate examples of extracting a horizontal edge and a vertical edge according to the present invention;

FIGS. 4A to 4D illustrate examples of feature templates according to the present invention;

FIGS. 5A and 5B illustrate examples of learning data input for image recognition learning according to the present invention.

DETAILED DESCRIPTION OF THE PREFERRED EMBODIMENT

Figure 1:
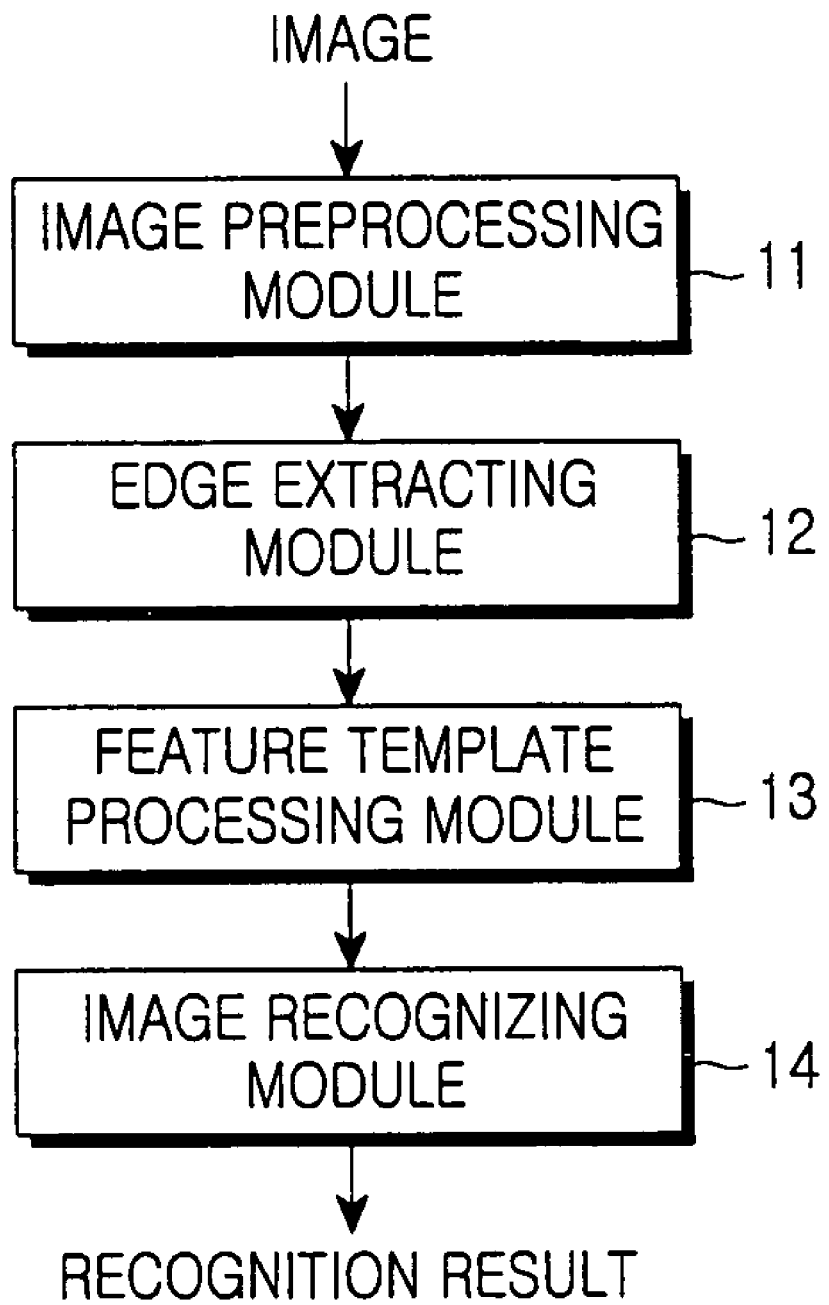
FIG. 1 is a block diagram illustrating the structure of an apparatus for recognizing an image according to the present invention.

Hereinafter, preferred embodiments of the present invention will be described in detail with reference to the accompanying drawings. Note that the same or similar components in drawings are designated by the same reference numerals as far as possible although they are shown in different drawings. In the following description of the present invention, a detailed description of known functions and configurations incorporated herein will be omitted when it may make the subject matter of the present invention unclear.

FIG. 1 is a block diagram illustrating the structure of an apparatus for recognizing an image according to the present invention.

The apparatus for recognizing an image according to the present invention includes an image preprocessing module 11, an edge extracting module 12, a feature template processing module 13, and an image recognizing module 14.

The image preprocessing module 11 clears the overall contour of a subject. The change of an illumination has an influence on the performance of a whole system, and the brightness of the illumination being too light or too dark makes the contour of the subject indistinct, so as to make it difficult to recognize the subject. Accordingly, before an input image undergoes a main processing procedure, the input image undergoes a preprocessing procedure in the image preprocessing module 11 for removing indefiniteness of a subject due to the illumination.

The image preprocessing procedure includes Histogram Equalization and Min-Max Normalization. It is preferred that the Min-Max Normalization shown in Equation 1 is used as the preprocessing procedure according to the present invention.

$$y^1 = \left( \frac{y - \min_1}{\max_1 - \min_1} \right)(\max_2 - \min_2) + \min_2 \quad (1)$$

Herein, $\min_1$ and the $\max_1$ denote the minimum brightness value and the maximum brightness value of an input image, respectively, and $\min_2$ and the $\max_2$ denote the minimum brightness value and the maximum brightness value after the image preprocessing procedure. In addition, y denotes the value of a pixel of the input image. The value of $y^1$ denotes the value of a pixel corrected through the image preprocessing procedure. The value of the pixel is within the range of 0 to 255 in the case of, for example, a black image. In the case of a color image, the R, G, and B values of the pixel are within the range of 0 to 255, respectively.

The image preprocessing module 11 performs the image preprocessing procedure for all input images. FIGS. 2A and 2B illustrate an example of the image preprocessing procedure and illustrates that an input image in FIG. 2A having undergone the image preprocessing procedure is changed into an image in FIG. 2B having an overall clear contour.

The edge extracting module 12 extracts a horizontal edge and a vertical edge from the image having undergone the image preprocessing procedure. This is because an amount of information is reduced when feature information extracted from an input image is used rather than when information about the input image is used as it is. In addition, generally, an edge image is less sensitive to the change of illumination as compared with a full image having a predetermined pixel value.

FIGS. 3A to 3D illustrate examples of a horizontal edge and a vertical edge extracted in the edge extracting module 12.

The edge extracting module 12 extracts a horizontal edge image in FIG. 3C and a vertical edge image in FIG. 3D from a candidate image in FIG. 3B of the image in FIG. 3A having undergone the image preprocessing procedure.

The feature template processing module 13 calculates a feature vector of a subject to be obtained from an image by using a feature template. The feature template is provided in the present invention in order to reduce an amount of information processed when an image is recognized. The feature template is used in order to divide the candidate area into a plurality of areas.

The feature template processing module 13 extracts one feature vector value using one feature template with respect to a candidate area. The feature template processing module 13 divides the candidate area into a plurality of areas defined based on the feature template, calculates differences between pixel values corresponding to the areas, and finds a feature vector value for the candidate area by adding the differences. This is expressed as Equation 2; an example of a feature vector value calculated when a feature template is divided into two areas.

$$D = \sum_X \{W(X) - B(X)\} \quad (2)$$

Herein, W represents a pixel value for one area of the feature template, and B represents a pixel value for the other area of the feature template. In addition, X represents a coordinate value at each area.

Since the use of this feature template allows only one feature vector based on one feature template to be extracted with respect to the candidate area, the amount of information to be processed is remarkably reduced. In the case of a color image, differences between pixel values are calculated with respect to R, G, and B of each pixel, and a feature vector value is calculated by adding the differences, so that one feature vector value based on one feature template is extracted.

It is preferred that several feature templates are employed according to subjects to be distinguished in order to exactly recognize corresponding subjects. In addition, shapes of divided areas are different from each other such that features of a corresponding subject can be finely extracted.

In the meantime, Equation 3 shows another scheme of calculating a feature vector using a feature template.

$$D = \frac{\sum \min(W(X), B(X))}{\min\left(\sum_X W(X), \sum_X B(X)\right)} \quad (3)$$

Feature templates may be expressed as shown in FIGS. 4A to 4D in detail. Herein, in order to distinguish areas, the feature templates are expressed using a white color and a black color. A feature template of FIG. 4A is divided into two areas of a right area and a left area, and a feature template of FIG. 4B is divided into two areas of an up area and a bottom area. Although it seems as if feature templates of FIG. 4C and FIG. 4D are divided into four areas, the feature templates are substantially divided into two areas of a black area and a white area, respectively, while varying the division pattern thereof.

If Equation 3 is applied to FIGS. 4A to 4D, W and B stand for pixel values of a white area and a black area, respectively. All symmetrical pixels in the white area and the black area are compared with each other while moving coordinates. In the coordinate value X, a coordinate starting point and a coordinate movement direction are different in every feature template area. For example, since the feature template in FIG. 4A is used in order to distinguish the symmetry of an image, it is preferred that Equation 3 is used while moving coordinates in the black colored area 41 from a left side to a right side and while moving coordinates in white colored area 42 from a right side to a left side. Since the feature template in FIG. 4B is used for recognizing the longitudinal symmetric feature of an image, it is preferred that Equation 3 is used while moving coordinates in the black colored area 43 from an upper side to a lower side and while moving coordinates in white colored area 44 from a lower side to an upper side. In the meantime, the feature template in FIG. 4C is used in order to distinguish the symmetry of an image in more detail by dividing the symmetrical image into an upper part and a lower part. The movement direction of coordinates in the feature template in FIG. 4C is identical to that in the feature template in FIG. 4A. In addition, the symmetrical relation between a black colored area 45 and a white colored area 46 and the symmetrical relation between a black colored area 48 and a white colored area 47 can be recognized in more detail by distinguishing the relation between the black colored area 45 and the white colored area 46 from the relation between the black colored area 48 and the white colored area 47. In the meantime, the feature template in FIG. 4D is used in order to distinguish the symmetry of an image in more detail by dividing the longitudinal symmetric image into a right part and a left part. The movement direction of coordinates in the feature template in FIG. 4D is identical to that in the feature template in FIG. 4B. In addition, the longitudinal symmetric relation between a black colored area 50 and a white colored area 49 and the longitudinal symmetric relation between a black colored area 51 and a white colored area 52 can be recognized in more detail by distinguishing the relation between the black colored area 50 and the white colored area 49 from the relation between the black colored area 51 and the white colored area 52.

If a human face is used as an experimental subject, it is enough to provide only the four feature templates shown in FIGS. 4A to 4D. If a face is a subject to be recognized as shown in a candidate area of FIGS. 3A to 3D, the face has symmetrical features, so that the value of a feature vector D for the feature template in FIG. 4A is approximate to '1', and the value of a feature vector D for the feature template in FIG. 4B is approximate to '0'. Accordingly, the value of a feature vector is within the range of '0' to '1'.

In other words, if four feature templates are used with respect to both a horizontal edge and a vertical edge as data required for recognizing a face, only eight numbers of data are used in order to recognize the face. Therefore, the greatest effect according to the present invention is that the number of data to be used for learning and recognition for the image is remarkably reduced in the image recognizing module 14.

In particular, the feature template processing module 13 calculates a feature vector using horizontal edge information and vertical edge information extracted by the edge extracting module 12, thereby reducing a computation amount as compared with a case where a feature vector is directly extracted from an input image.

The image recognizing module 14 performs learning or image recognition with respect to a subject to be obtained from an input image using a feature vector extracted in the feature template processing module 13. It is necessary for an image recognizing device to previously perform a learning process in order to exactly recognize an image. In other words, the image recognizing module 14 performs learning with respect to a subject to be recognized and has a database for learning results so as to later exactly recognize a subject. The image recognizing module 14 performs this learning procedure and recognizes a subject input later.

Hereinafter, a learning process for a subject to be recognized in the image recognizing module 14 will be described.

The image recognizing module 14 classifies feature vectors extracted by the feature template processing module 13 according to subjects. In order to enhance a learning effect, the image recognizing module 14 performs the learning procedure not only for a subject to be recognized, but also for an image, which is not the subject to be recognized.

In other words, in the learning procedure, the image recognizing module 14 extracts a criterion for determining a subject to be recognized by analyzing a feature vector value for a feature template identically employed for the subject to be recognized and an image which is not the subject to be recognized. That is, since a feature vector value for the subject to be recognized is different from a feature vector value for the image, which is not the subject to be recognized, with respect to the same feature template, the image recognizing module 14 extracts the criterion for determining the subject to be recognized in the learning procedure.

FIGS. 5A and 5B are views illustrating examples of learning data on the assumption that a subject to be recognized is a face. The learning data includes data about a face which is a subject to be recognized and data (which are not face data) distinct from a face as shown in FIGS. 5A and 5B. FIG. 5A illustrates data about a face which is a subject to be recognized, and FIG. 5B illustrates data which are not face data. As shown in FIG. 5A, the data about the face has a predetermined rule that eyes, a noise, and a mouth are symmetrical. However, data, which is not face data as shown in FIG. 5B, have features distinct from the features of a face. In other words, the image recognizing module 14 determines if a feature vector value of a next input image is included in a distribution area for feature vector values of learned face data by using distribution information of a feature vector value for face data shown in FIG. 5A and distribution information of a feature vector value for data, which are not face data, shown in FIG. 5B. If the feature vector value of the next input image is included in the distribution area for feature vector values of learned face data, the input image is distinguished as a face. Otherwise, it is determined that the input image is not a face. As the number of these learning data increases, it is possible to obtain a superior learning effect. In addition, the following face recognition is performed with higher accuracy.

In more detail, the image recognizing module 14 is realized using a support vector machine (SVM), thereby extracting a criterion for classifying a subject to be recognized and determining the subject to be recognized using the criterion in the image recognizing module 14. Hereinafter, an example of a scheme for extracting a criterion for classifying a recognition subject and determining a recognition subject of an image using the criterion in the image recognizing module 14 will be described.

According to the SVM, a non-linear feature vector space having a high degree can be linearly projected and analyzed, and the optimal boundary (i.e., the optimal decision boundary) between feature vectors is provided. In other words, the present invention provides the optimal boundary between feature vectors of a subject to be recognized and feature vectors of an image which is not the subject to be recognized by using feature vectors of both the subject to be recognized and the image which is not the subject to be recognized.

The SVM arbitrarily extracts a subject to be recognized and an image which is not the subject to be recognized so as to divide them into two areas and extracts a support vector value based on the divided areas. Herein, the support vector denotes a vector around a decision boundary from among feature vectors extracted from divided areas of arbitrarily selected images. For example, referring to FIGS. 5A and 5B, according to the present invention, the support vector value corresponds to a vector value around the decision boundary dividing feature vector values for face data and data which are not face data.

The SVM has support vector values according to subjects to be recognized through learning and then determines if an image input from the feature template processing module 13 is a subject to be recognized according to an area to which a feature vector of the image belongs based on a decision boundary.

Figure 6:
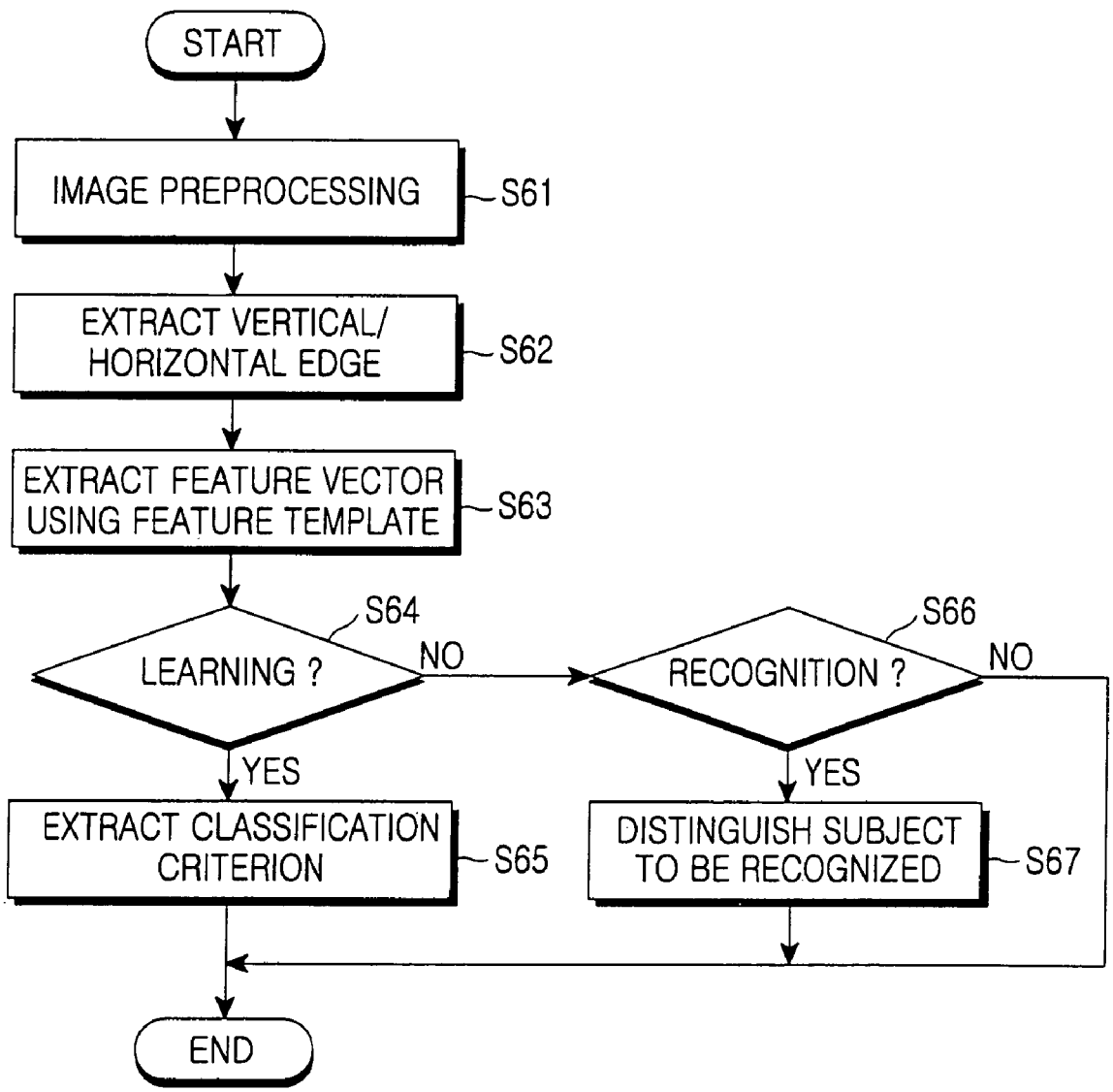
FIG. 6 is a flowchart illustrating a method for recognizing an image according to the present invention.

Hereinafter, a scheme for learning and recognizing an image in the image recognizing device will be described with reference to FIG. 6.

The image recognizing device clears the contour of an input image through the image preprocessing procedure in the image preprocessing module 11 (step S61) and sends the image to the edge extracting module 12.

The edge extracting module 12 extracts a horizontal edge and a vertical edge from the image having undergone the image preprocessing procedure (step S62) and delivers the horizontal edge and the vertical edge to the feature template processing module 13.

The feature template processing module 13 extracts a feature vector value to be delivered to the image recognizing module 14 (step S63) by applying corresponding feature templates to horizontal edge information and vertical edge information.

Thereafter, the image recognizing module 14 determines if a current step corresponds to a learning step (step S64) or a recognition step (step S66). If it is determined that the current step corresponds to the learning step (step S64), a criterion for determining a subject to be recognized by using the feature vector values is extracted (step S65). If it is determined that the current step corresponds to the recognition step (step S66), it is determined if a certain image is the subject to be recognized by using the classification criterion (step S67).

Herein, it is preferred that the learning is performed with respect to all images including a subject to be recognized and an image which is not the subject to be recognized. The learning is performed by applying the same feature template to both the subject to be recognized and the image which is not the subject to be recognized. Even a corresponding subject is determined using feature vectors for identical feature templates.

As described above, according to the present invention, a feature vector is extracted using a feature template, thereby remarkably reducing a data amount required for image recognition as compared with the conventional technique having a data amount proportional to the number of pixels. According to the present invention, it is possible to reduce a computation amount and a time required for image recognition and it is easy to apply the present invention to an application system based on a portable terminal or a network.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the described embodiments, but should be defined by the appended claims and equivalents thereof.

What is claimed is:

1. An apparatus for recognizing an image, the apparatus comprising:
    a feature template processing module for extracting one feature vector value based on one corresponding feature template for each of at least one feature template by using the at least one feature template to divide an image into a plurality of areas; and
    an image recognizing module for performing learning and image recognition with respect to a subject to be recognized in the image using the extracted feature vector value,
    wherein the feature vector value is obtained by calculating differences between symmetrical pixel values in the plurality of areas defined by the corresponding feature template and summing up the differences.

2. An apparatus for recognizing an image, the apparatus comprising:
    an image preprocessing module for adjusting a brightness of the image so as to clear a contour of a subject to be recognized;
    an edge extracting module for extracting horizontal edge information and vertical edge information from an image having its contour clearly adjusted by the image preprocessing module;
    a feature template processing module for extracting respective feature vector values from the vertical edge information and the horizontal edge information using at least one feature template to divide the image into a plurality of areas; and
    an image recognizing module for extracting a criterion for determining an image to be recognized using the feature vector values and recognizing the subject using the criterion,
    wherein the feature vector values are obtained by calculating differences between symmetrical pixel values in the plurality of areas and summing up the differences.

3. The apparatus as claimed in claim 2, wherein the at least one feature template is provided according to subjects to be recognized.

4. The apparatus as claimed in claim 1, wherein the learning is performed by employing an identical feature template for the subject to be recognized and an image which is not the subject to be recognized.

5. The apparatus as claimed in claim 4, wherein the learning includes extracting a criterion for distinguishing the subject to be recognized and the image which is not the subject to be recognized.

6. The apparatus as claimed in claim 5, wherein the recognition is performed by comparing the criterion extracted through the learning with a feature vector value of the subject to be recognized.

7. A method for recognizing an image, the method comprising the steps of:
- extracting, by a feature vector template processing module, one feature vector value based on one corresponding feature template for each of at least one feature template by using the at least one feature template for dividing an image into a plurality of areas; and
- performing, by an image recognizing module, learning and image recognition with respect to a subject to be recognized in the image using the extracted feature vector value,
- wherein the feature vector value is obtained by calculating differences between symmetrical pixel values in plural areas defined by a corresponding feature template and summing up the differences.

8. A method for recognizing an image, the method comprising the steps of:
- adjusting a brightness of the image so as to clear a contour of a subject to be recognized;
- extracting horizontal edge information and vertical edge information from an image having its contour clearly adjusted;
- extracting respective feature vector values from the vertical edge information and the horizontal edge information using at least one feature template to divide the image into a plurality of areas;
- extracting a criterion for determining an image using the feature vector value; and
- recognizing the subject to be recognized using the criterion,
- wherein the feature vector values are obtained by calculating differences between symmetrical pixel values in the plurality of areas and summing up the differences.

9. The method as claimed in claim 8, wherein the at least one feature template is provided according to subjects to be recognized.

10. The method as claimed in claim 7, wherein the learning is performed by employing an identical feature template for the subject to be recognized and an image which is not the subject to be recognized.

11. The method as claimed in claim 10, wherein the learning extracts a criterion for distinguishing the subject to be recognized and an image that is not the subject.

12. The method as claimed in claim 11, wherein the recognition is performed by comparing the criterion extracted through the learning with a feature vector value of the subject to be recognized.

* * * * *